United States Patent [19]

Probert, Jr.

[11] 4,034,347

[45] July 5, 1977

[54] METHOD AND APPARATUS FOR CONTROLLING A MULTIPROCESSOR SYSTEM

[75] Inventor: Geoffrey Probert, Jr., Broomfield, Colo.

[73] Assignee: Bell Telephone Laboratories, Incorporated, Murray Hill, N.J.

[22] Filed: Aug. 8, 1975

[21] Appl. No.: 603,178

[52] U.S. Cl. ............................................. 364/200
[51] Int. Cl.² ................. G06F 13/00; G06F 15/16
[58] Field of Search ................. 340/172.5; 445/1

[56] References Cited

UNITED STATES PATENTS

| | | | |
|---|---|---|---|
| 3,229,260 | 1/1966 | Falkoff | 340/172.5 |
| 3,242,467 | 3/1966 | Lamy | 340/172.5 |
| 3,348,210 | 10/1967 | Ochsner | 340/172.5 |
| 3,349,375 | 10/1967 | Seeber et al. | 340/172.5 |
| 3,480,914 | 11/1969 | Schlaeppi | 340/172.5 |
| 3,510,844 | 5/1970 | Aranyi et al. | 340/172.5 |
| 3,551,892 | 12/1970 | Driscoll, Jr. | 340/172.5 |
| 3,560,934 | 2/1971 | Ernst et al. | 340/172.5 |
| 3,566,363 | 2/1971 | Driscoll, Jr. | 340/172.5 |
| 3,568,160 | 3/1971 | Talarczyk | 340/172.5 |
| 3,593,300 | 7/1971 | Driscoll, Jr. | 340/172.5 |
| 3,715,729 | 2/1973 | Mercy | 340/172.5 |
| 3,761,879 | 9/1973 | Brandsma et al. | 340/172.5 |
| 3,768,074 | 10/1973 | Sharp et al. | 340/172.5 |
| 3,774,157 | 11/1973 | Tsui | 340/172.5 |
| 3,787,818 | 1/1974 | Arnold et al. | 340/172.5 |
| 3,798,591 | 3/1974 | Phillips et al. | 340/172.5 |
| 3,812,473 | 5/1974 | Tucker | 340/172.5 |
| 3,820,081 | 6/1974 | Donahue | 340/172.5 |
| 3,840,859 | 10/1974 | Vigil | 340/172.5 |

OTHER PUBLICATIONS

Sell, J. V.; "Microprogramming in an Integrated Hardware/Software System" in *Computer Design*, Jan. 1975; pp. 77–84.

Heart, F. E.; "A New Minicomputer/Multiprocessor for the ARPA Network" in *National Computer Conference Proceedings*, 1973; pp. 529–537.

Cohn, E.; "Symmetric Multi-Miniprocessors: A Better Way to Go?" in *Computer Decisions*, Jan. 1973; pp. 16–20.

Levy, J. V.; "Computing with Multiple Microprocessors" in *International Workshop on Computer Architecture Proceedings*, June 1973; pp. 1–49.

Reyling, G., Jr.; "*Performance and Control of Multiple Microprocessor System*" in *Computer Design*, Jan. 1975; pp. 81–86.

*Primary Examiner*—Melvin B. Chapnick
*Attorney, Agent, or Firm*—Donald M. Duft

[57] ABSTRACT

A multiprocessor system having a computer poller and a memory poller for controlling information transfer over a time multiplex bus between a plurality of computers and an interleaved memory comprising a plurality of sections. Each poller comprises a counter and a clock so that as the counter is incremented by the clock, each computer or memory section, respectively, is sequentially interrogated to determine whether or not it requires access to a memory or computer, respectively.

27 Claims, 5 Drawing Figures

FIG. 4
COMPUTER POLLING

FIG. 5
MEMORY POLLING

METHOD AND APPARATUS FOR CONTROLLING A MULTIPROCESSOR SYSTEM

BACKGROUND OF THE INVENTION

1. Field of the Invention

This invention relates to a multiprocessor system, and, in particular, to a time multiplexed multiprocessing system having equipment for polling computer and memory requests.

2. Description of the Prior Art

Generally in multiprocesor systems, a plurality of computers must compete with each other for access to a main memory since the main memory can generally service only one computer at a given time. One technique to minimize the problem of such simultaneous access is to physically construct the main memory with a number of separate, independent, and relatively small memory sections. A centralized switch is then provided that can connect any memory section to any computer in accordance with the memory section access needs of the computer.

To create the illusion of a single memory, address interleaving as discussed in "Microprogramming in an Intergrated Hardware/Software System", by John V. Sell, COMPUTER DESIGN, January, 1975, page 77–84 places each sequential address in a different memory section. With each memory section operating independently, interference is greatly reduced between the computers accessing the memory. It can be readily seen that the more memory sections provided, the greater the probability that a bidding computer will obtain access to a particular memory section. Address interleaving and the provison of a plurality of memory sections is utilized in part in the present invention.

Various approaches and techniques have been used to interconnect interleaved memory sections with the computers. Some prior art approaches utilize a space division switching arrangement wherein sufficient hard-wire interconnections are provided to provide access between each computer and each memory section. In such arrangements, complicated control circuitry, perhaps including the provision of a controlling computer, is necessary to control the space division switching. The major advantage of space division switching is that many computers may simultaneously utilize different memory sections thereby reducing interference between the computers. However, the space division switching may be extremely expensive and the cost to provide such a network increases rapidly with the number of computers and/or memory sections.

Other prior art approaches utilize a time multiplexed bus to interconnect the computers with the memory sections. Such an approach is low cost and the cost increases negligibly as the number of computers and memory sections are increased. In such an arrangement, interface logic having decoders must be provided for each computer and for each memory section. A major problem with time multiplex arrangements is that the system throughput becomes limited by the bus capacity as processors are added.

In time multiplexed multiprocessor systems, the control of data flow from the computers to the memory sections, and vice versa, also requires complex control circuitry. This is especially true, when several processors request simultaneous access to the same memory section. Various prior art tie breaking and arbitration arrangements have been proposed to allocate such computer access.

Although prior art arrangements for arbitrating computer requests operate satisfactorily, the cost of such approaches, in both hardware and software, as well as subsequent maintenance costs is expensive especially when additional computers and memory sections are added to the multiprocessor system.

BRIEF SUMMARY OF THE INVENTION

It is, therefore, an object of the present invention to provide an improved arrangement for providing computer access to an interleaved memory in a multiprocessing system.

It is a further object to provide a multiprocessing system polling circuit having a minimum of cost and complexity.

SUMMARY DESCRIPTION

Prior art multiprocessor systems utilizing a time multiplex bus interconnecting a plurality of computers with a plurality of memory sections provide access control comprising complicated control circuitry and generally include the requirement of an additional computer dedicated to controlling access over a time division network. I provide a polling arrangement for controlling processor requests to the memory sections in order to minimize cost and to provide flexibility for low cost module growth.

My invention is disclosed as embodied in a multiprocessing system using identical microprogramed processors having access over a time multiplex bus to a plurality of identical memory sections.

In accordance with my invention, I provide a computer polling circuit and a separate memory polling circuit for controlling, respectively, the computer access to the memory sections and the memory section access to the computers. Each poller comprises a binary counter and clock for incrementing the counter. As the binary counter, for example, in the computer poller is incremented, each computer is sequentially interrogated to determine whether or not it requires access to a memory section. If a memory request is detected, the counter then provides additional timing pulses and the requesting computer is given access to the requested memory section over the time multiplexed bus. The memory poller operates in a similar fashion.

FEATURES

A feature of the present invention is the provision of an improved polling and timing facility for a computer requesting access to any one of a plurality of memory sections over a time multiplex bus in a multiprocessor system.

Another feature is the provision of facilities in a currently polled computer for transmitting information, including a READ or WRITE request, to a memory section specified by the polled computer.

Another feature is the provision of an improved polling and timing arrangement for a memory section requesting access to any one of a plurality of computers over a time multiplexed bus in a multiprocessing system.

Another feature is the provision of facilities in a polled memory section for transmitting information to a specified computer in response to a READ or WRITE request priorly received from the specified computer.

A further feature is the provision of facilities including a first timing arrangement controlled by a clock and a binary counter to allow access by a requesting computer to any one of a plurality of memory sections over a time multiplexed bus and a second timing arrangement comprising a clock and second counter for providing access to a requesting memory section over a time multiplexed bus to any one of a plurality of computers.

DRAWING

These and other objects and features of my invention will become more apparent upon a reading of the following description thereof taking in conjunction with the drawing in which.

GENERAL DESCRIPTION

Figure 1:
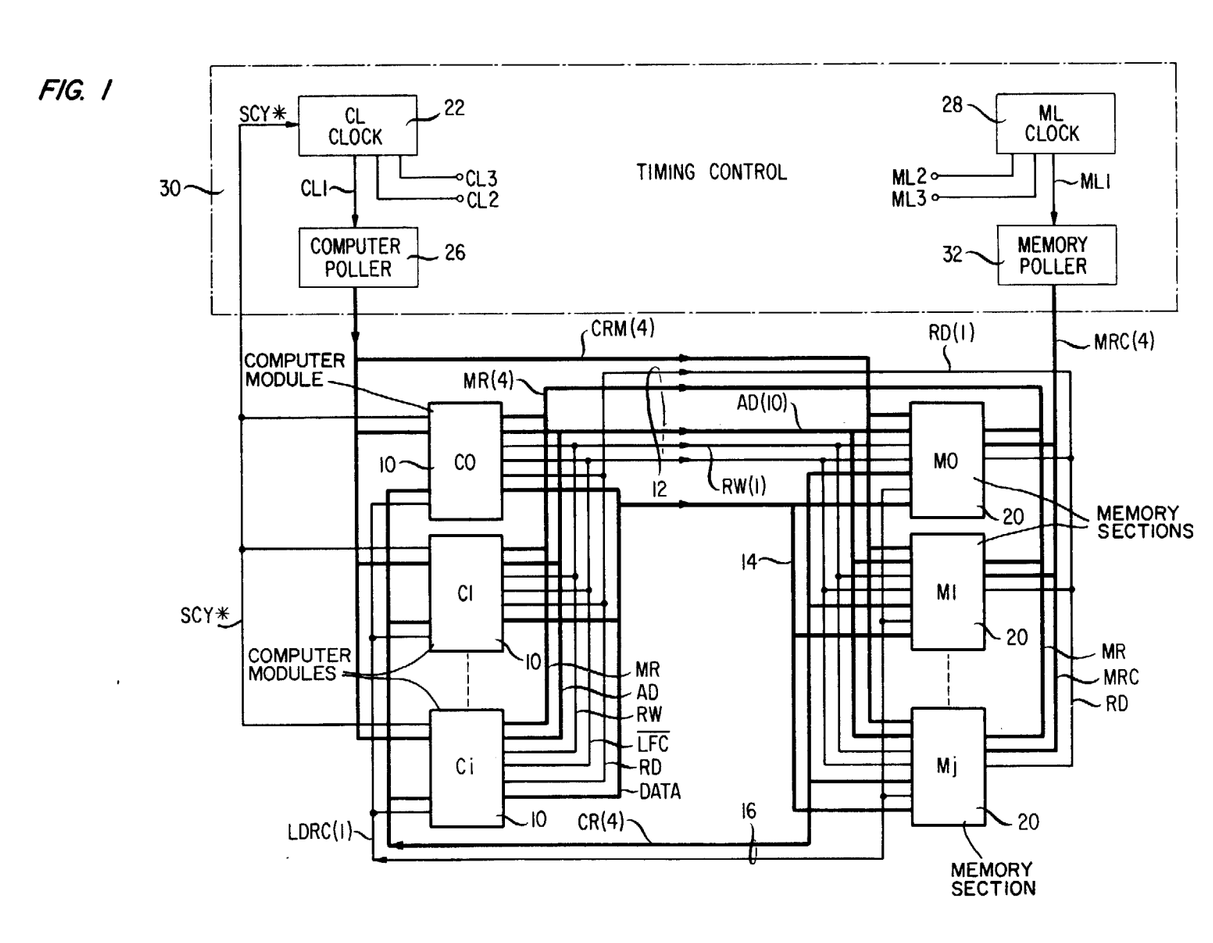
FIG. 1 discloses a multiprocessing system configured in accordance with one illustrative embodiment of my invention.

FIG. 1 is a block diagram depicting a multiprocessor system having a plurality of computer modules 10 a plurality of memory sections 20, and a timing control 30.

In an effort to simplify the description as much as possible consistent with the full disclosure of my invention, only three computer modules CO, C1, C$i$ are illustrated. Moreover, only three memory sections MO, M1, M$j$ are shown. However, in an actual multiprocessor system, a greater number of such computers and memories could be utilized. For example, a typical multiprocessor system of the present invention may comprise 16 computer modules 10 and 16 memory sections 20.

The operation of the depicted multiprocessor system shown in FIG. 1 is described only to the extent required for an understanding of my invention. For a more comprehensive understanding of the operation of multiprocessor systems utilizing microprogramed computers, reference can be made to "Performance and Control of Multiple Microprocessor Systems" by George Reyling, Jr., COMPUTER DESIGN, March, 1974, pg 8186.

As is well known in multiprocessor art, any computer module 10 should be able to gain access to any memory section 20 provided that the requested memory section is not currently being accesed by another computer module. Likewise, any memory section 20 should be able to have access to any computer module 10 in order to provide the requesting computer data from that memory section. My invention, therefore, provides access over the time multiplex memory bus 12 from any computer module 10 to any memory section 20. In a similar fashion, any memory section 20 may access any computer module 10 over the time multiplex computer bus 16. The memory bus 12 and the computer bus 16 permit the transfer of information for identifying the requested computer module or memory section, the address of the data within the requested memory section, and miscellaneous control commands. The data is then exchanged between the computer modules 10 and the memory sections 20 over a time multiplex data bus 14.

My invention utilizes identical computers 10 and identical memory sections 20. Such an arrangement is conventional as discussed, for example, in "A new minicomputer/multiprocessor for the ARPA network", by F. E. Heart, et al. PROCEEDINGS OF THE 1973 NATIONAL COMPUTER CONFERENCE, pg. 529–537.

The use of time multiplex buses 12, 14, and 16 to interconnect the computer modules 10 with the memory sections 20 is also conventional as disclosed, for example, in the above reference by F. E. Heart, et al. When time multiplexed buses are used in a multiprocessor system, the identities of each computer module 10 and of each memory section 20 must be generated. In one embodiment of my invention wherein 16 computer modules 10 and 16 memory sections 20 are used, the identity of each computer module or of each memory section can be uniquely identified by separate groupings of four binary digits. Therefore, memory bus 12 and computer bus 16 must make provision for delivery of the identity of the memory sections and the computer modules. The identity of the memory section to be accessed is delivered over the MR leads of memory bus 12. Each memory section 20 has associated with it a decoder which constantly analyzes the data appearing on the MR leads of bus 12. When a requested memory section detects its codes on the MR leads, it then handles the computer request. In so doing, the requested memory section 20 obtains access to a requesting computer module by applying the computer modules identity code to leads CR of computer bus 16. Each computer module 10 also has a decoder associated with it to constantly analyze the information appearing on leads CR in order to detect its identity code. The foregoing use of identity codes for each computer module 10 and memory section 20 and the use of related decoders associated with each computer module 10 and each memory section 20 is conventional.

Other information must also be delivered to a memory section 20 when a computer module requests access to the memory section. The identity of the computer module requesting access is delivered to the requested memory section over leads CRM. This computer identity data is necessary, when, at a later time, the requested memory section delivers the data read from the appropriate address location of its memory to the requesting computer module. The identity of the requesting computer module applied to the requested memory section over leads CRM is subsequently applied over leads CR of bus 16 so that the requesting computer module will recognize its own identity code in order to receive data from the requested memory section over data bus 14.

When a requesting computer module desires to read information from a memory section, not only must is send the identity of the memory section over leads MR and deliver its own identity over leads CRM, the requesting computer module must also deliver the address of the data within the memory section over leads AD. It also indicates whether the address on leads AD is to be used for reading data from the location or for writing data into that location by applying the appropriate signal to the READ/WRITE lead RW. The RD and LFC* leads are used for signaling as will be more fully discussed hereinafter.

If the signal on READ/WRITE lead RW specifies a WRITE operation, the requested memory section receives the data to be written into the specified address location over data bus 14. For this operation, the requesting computer module receives its own identity code from the memory section on leads CR and an indication on the LDRC lead from the memory section that the memory section is ready to receive the data to be written from the computer. The requesting computer module then transmits the data to be written into the specified address location over the data bus to the memory section.

The present invention utilizes the concept of address interleaving in order to create the illusion that the plurality of computer modules 10 are addressing a single main memory rather than a plurality of separate and discrete memory sections. This concept is conventional as discussed, for example, in "Microprogramming in an Integrated Hardware/Software System" by John V. Sell, COMPUTER DESIGN, Jan., 1975, pg. 7784.

Consider that computer module $C_i$ is interacting with a periphery, not shown, to process information signals. The program which computer module $C_i$ must follow resides in the plurality of memory sections 20 wherein each memory section contains different segments of the program. For example, if the program is comprised of only 16 words, each memory section would contain, in a typical system of 16 memory sections, one program word. Therefore, as computer $C_i$ processes its way down the program list, the first program word may reside in memory section M0, while the 16th program word may reside in memory section M15.

The timing control 30, in a manner to be subsequently described in detail, control the interaction of computer modules 10 with memory sections 20. The timing control 30 contains two separate and asynchronous clocks 22 and 28 each pulsing a polling counter 26 and 32, respectively. The CL clock 22 generates binary pulses over lead CL1 to access the computer poller 26. Computer poller 26 in the present embodiment is a 4-bit binary counter which is continually incremented by the clock 22 over lead CL1. The size of the counter is dependent on the number of computer modules e.g. a three-bit counter could service a maximum of eight computer modules. The outputs of computer poller 26 generates the aforementioned computer module identity code which is delivered to the memory sections 20 over leads CRM. This identity code is also delivered over leads CRM to each of the computer modules 10.

As computer poller 26 is incremented from a value of binary 0 to a value of binary 15, each of the computer modules 10 is interrogated, in sequence in a manner to be subsequently described, to determined whether an interrogated module desires access to any memory section.

If that computer module does desire access to a memory section at that time, then that computer module is given access over memory bus 12 to a requested memory section.

In a similar manner, the ML clock 28 applies binary timing pulses over lead ML1 to a 4-bit binary memory poller 23. The memory poller 32 interrogates the status of each of the memory sections 20 to determine whether any section requires access to a requesting computer module. If a memory section requires such access, access is provided over bus 16 to the requesting computer. It is evident that CL clock 22 and ML clock 28 operates independently of each other and that it is possible for a memory section to be accessing a computer module during the same time interval another computer module is acessing another memory sectiom.

It is apparent that my invention enables a plurality of computer modules 10 to access a plurality of memory sections 20 while at the same time allowing the plurality of memory sections 20 independent access to the plurality of computer modules 10 under supervision of a timing control 30 comprising a minimum of hardware.

DETAILED DESCRIPTION

Figure 2:
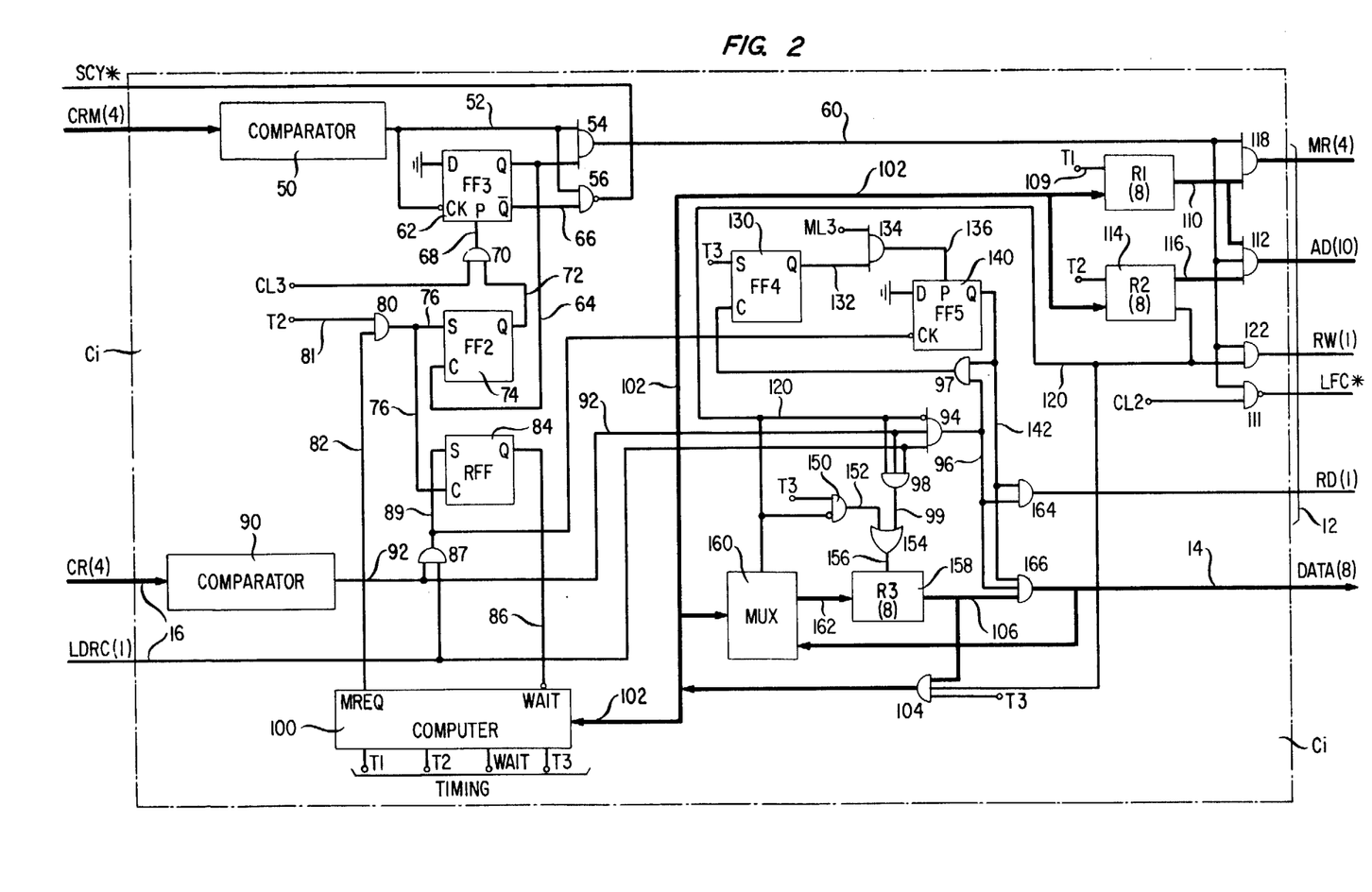
FIG. 2 illustrates the interface logic comprising one of the plurality of computers as illustrated in FIG. 1.

FIG. 2 shows the detail of a computer module, such as module $C_i$, which comprises computer 100 and its associated interface logic. Computer 100 may be a conventional INTEL 8008 eight-bit paralleled central processor unit manufactured by the Intel Corporation and disclosed in the 1975 INTEL DATA CATALOGE at page 6-25.

With reference to FIG. 1, the interface logic of computer module $C_i$ must perform control functions for what may be said to be three basic system interactions. The first interaction concerns the recognition of a computer request and involves the interface between computer module $C_i$ and timing control 30 over leads SCY* and CRM. The second and third interactions occur between computer module $C_i$ and a requested memory section when data is either being read from or being written into that memory section. The latter two interactions require information transmittal over leads MR, AD, RW, DATA, RD, CR, and LDRC. Each of these interactions is discussed in the following paragraphs.

The first interaction between timing control 30 and computer module $C_i$ occurs when the computer poller 26 interrogates each computer module 10 to determine whether any module requires access to any memory section 20. When poller 26 contains the identity or code of computer module $C_i$, the comparator 50 on FIG. 2 outputs a high signal on lead 52 to partially enable gates 54 and 56. Comparator 50 comprises SN7485N integrated circuit manufactured by Texas Instruments, Inc. and disclosed in the TTL DATA BOOK FOR DESIGN ENGINEERS (1st ed. 1973) on page 202.

Each comparator is hardwired with the code of the computer module of which it is a part. Thus, with reference to FIG. 2, when comparator 50 receives its own code from the computer poller 26 over leads CRM, a comparison is detected by means of its internal hardwiring, and this comparison results in an output signal being applied to conductor 52. The response of the circuitry of FIG. 2 to this output from the comparator on lead 52 depends upon the current state of the FIG. 2 circuitry and, in particular, depends upon whether or not the computer 100 has requested access to a memory module. The alternative circuit actions that may occur at this time in response to the comparator output pulse are described in detail in the following paragraphs.

Figure 4:
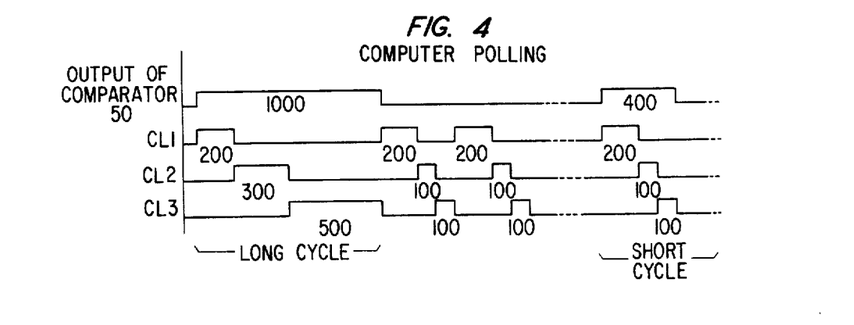
FIG. 4 illustrates the timing sequence necessary for activating the interface logic of FIG. 2.

FIG. 4 illustrates the time wise relationship between the CL1, CL2, and CL3 outputs of the clock 22 and the output of a computer module computer module comparator 50 at the time the comparator detects the receipt of its own identity code from computer poller 26. With reference to FIGS. 1, 2, and 4, the leading edge of the CL1 pulse advances the computer poller 26 one position. Let it be assumed that the position of the poller 26 at this time specifies and applies to leads CRM, the identity of the computer module C*i* shown on FIG. 2. This being the case, the comparator 50 generates an output pulse that is essentially coincident with the leading edge of the CL1 pulse. This comparator output pulse is shown on FIG. 4 and it persists until the occurrence of the leading edge of the next CL1 pulse, at which time the computer poller is advanced to another position to specify another computer module.

The CL2 and CL3 pulses occur in sequence following the CL1 pulse. The time duration of a single sequence of these three pulses may vary depending upon whether or not the addressed computer module is at that time requesting access to a memory module. As shown in FIG. 4, for the first sequence of these three CL− pulses, a single sequence and the output of the comparator 50 has a duration of 1,000 nanoseconds if the addressed computer module is requesting access to a memory module. A sequence of this duration is termed a long cycle as shown in FIG. 4. A sequence of three CL− pulses span only 400 nanoseconds and is termed a short cycle if the addressed computer module is not at that time requesting access to a memory module. A short cycle sequence is shown for the last sequence of CL− pulses on FIG. 4.

As is subsequently described in detail, the response of gate 56 to the comparator output signal on lead 52 determines whether or not the computer poller 26 enters a long cycle or a short cycle. Flip-flop FF3 62 is in a reset state whenever the computer module is not requesting service. At that time, output lead 66 is high extending into the lower input of gate 56, and the reception of a comparator output signal on the upper input of gate 56 turns the gate on and drives its output low which extends over lead SCY* back to the CL clock 22. This SCY* signal indicates to the CL clock that the addressed computer module is not currently requesting service. The CL clock then generates a short cycle sequence of 400 nanoseconds.

Alternatively, flip-flop FF3 is in a preset state and conductor 66 is low whenever the computer module is requesting service. In this case, gate 56 does not turn on in response to the reception of a comparator output pulse and lead SCY* remains high. This causes the CL clock 22 to generate a long cycle of output pulses as shown for the first cycle on FIG. 4.

Each computer element 100, such as element 100 on FIG. 2 for computer module C*i*, operates independently of timing control 30 on FIG. 1 to perform its work function and to generate requests for access to a memory module. Requests for access to a memory module are for the purpose of either writing information supplied by the computer into the specified memory module or alternatively, for receiving information from the specified module for use by the computer. In performing its various functions including the request for access to a specified memory module, the computer generates the timing pulses shown on the bottom of element 100 on FIG. 2 with the pulses being generated in the order extending from left to right. Specifically, the pulses are generated in order of T1, T2, WAIT, and T3. As is subsequently described in detail, the T1 pulse gates the higher order 8-bits from bus 102 into register R1, the T2 pulse gates the lower order 8-bits from this bus into register R2 114. The T2 pulse is also applied to the upper input of AND gate 80 to partially enable it. If at this time, the computer 100 requires access to a memory section 20, a high signal appears on lead 82 to enable gate 80 and turn it on. The turn on of gate 80 sets the flip-flop FF274 over lead 76. The setting of this flip-flop delivers a high signal over lead 72 to partially enable gate 70 so that a subsequent CL3 clock pulse from the timing control 30 will turn on gate 70 and preset flip-flop FF3 over lead 68. The presetting of this flip-flop drives lead 66 low and lead 64 high. The high on lead 64 clears flip-flop FF2 and partially enables gate 54. The low on lead 66 holds gate 56 in a disabled state.

In partial summary of the foregoing, the preset state of flip-flop FF3 indicates that the computer 100 is currently requesting access to a memory module; alternatively, the normal state of flip-flop FF3 indicates that the computer module is not currently requesting access of the memory. The set state of the flip-flop partially enables AND gate 54 so that it can respond to a comparator output pulse on lead 52. The normal state of flip-flop FF3 partially enables AND gate 56 so that it responds to a comparactor output pulse on lead 52 when the computer module C*i* is addressed by the computer poller 26.

Let it first be assumed that module C*i* does not currently require access to a memory when it is addressed by computer poller 26. This being the case, flip-flop FF3 is in a normal state and gate 56 is partially enabled by the high on conductor 66. The comparator 50 detects its identity code on leads CRM at this time and applies a high over conductor 52 to the upper input of gate 56. This turns the gate on and applies a low to lead SCY* which extends to the CL clock 22 on FIG. 1. This low causes the CL clock to enter its SHORT CYCLE mode and thereby shorten the clock pulses on leads CL2 and CL3 as shown on FIG. 4. This rapidly increments the CL clock 22 to the code of the next computer module 10 so that it can be interrogated in the same manner as module C on FIG. 2.

It is known to provide clocks with both long and short cycle capabilities.

The interaction between timing control 30 and the computer modules 10 requires only five leads in the present embodiment: four leads are required for transmittal of the computer identity code on leads CRM and one lead is required for the return of the SHORT CYCLE signal on SCY*. Lead SCY* is normally held high so that the output of gate 56, which is wire-ORed with similar outputs from the remaining computer modules 10, goes low upon the occurence of a "no memory request" signal on lead 66 and detection of the module's identity on lead 52.

Let it next be assumed that computer 100 has loaded registers R1 and R2 and is in a WAIT state. It therefore requires access to memory section when it is addressed by computer poller 26. Flip-flop FF3 is currently in a preset state, as previously discussed, so that gate 54 is partially enabled by lead 64 and gate 56 is disabled by lead 66. Gate 56 therefore maintains lead SCY* high when the comparator output signal is received over lead 52. This causes the CL clock to provide LONG CYCLE timing pulses on leads CL2 and CL3 when it applies the code of module C*i* to path CRM.

Also, since flip-flop FF3 is currently in a preset state, gate 54 is partially enabled by the high on lead 64 so that upon the appearance of the identity code of module C*i* on leads CRM, gate 54 is fully enabled and applies a high signal to lead 60. This signal on lead 60 partially enables gates 112, 118, and 122. The output of these gates, as will be discussed in the following, applies the identity code of the requested memory section to leads MR, the address of the data within that memory section to leads AD, and a signal to lead RW indicating whether the current memory request is a READ or a WRITE request. This information is applied to bus 12. The subsequent appearance of the CL2 timing control pulse from CL clock 22 at the input of gate 111 on FIG. 2, gates a signal to the memory section on lead LFC*. The timing sequence of CL2 is shown in FIG. 4. The output 52 of comparator 50 also accesses the clock input of flip-flop FF3; this causes flip-flop FF3 to be cleared on the lagging edge of the output of comparator 50 shown in FIG. 4.

In partial summary and in accordance with my invention, each of the comparator modules 10 can be quickly interrogated to determine whether or not one requires access to any memory section 20. If a computer module 10 does require access to one of the memory sections 20, then that computer module is provided with a sequence of LONG CYCLE CL clock pulses to enable that computer module access to the requested memory section over the time multiplex bus 12. It is evident that this access is a dedicated access and that no other computer module 10 may gain access to the memory section during that time. At such times, the polled computer transmits a memory read or write request to a specified memory section. The computer then goes into and remains in its WAIT state until its memory request is honored.

The second and third interactions that the interface logic performs occur only when a requesting computer 100 subsequently obtains access to one of the memory sections 20 for a READ or WRITE operation in response to the earlier generation of a request by the computer.

The READ interaction or operation will be discussed first and it involves a two step process which relies on the internal timing steps or signals T1, T2, WAIT, and T3 of computer 100.

Prior to the presetting of flip-flop FF3 to generate a memory request that has already been described, computer 100, loaded register R1 with data it applied to bus 102 (which is an 8-bit parallel bus). This was done by activating the gate-in lead 109 of R1 during the T1 state. During the T2 state, register R2 received information from data bus 102 in a similar manner. Register R1 received the identity code of the requested memory section in its higher four bits. This was applied to gates 118. The lower four bits of R1 were delivered to gates 112 and combined with the six most significant bits of register R2 to comprise the address of the desired data within the memory section. One bit in register R2 was applied to gate 122 and signifies whether the memory request by the computer is a READ or a WRITE.

Thus, during the T1 and T2 earlier described timing states, registers R1 and R2 were loaded with data for delivery over leads 110 and 116 respectively and into gates 112, 118, and 122. This information was transmitted to and stored in a specified memory section where it represents a read or write request by the computer to the memory. Registers R1 and R2 are covential 8-bit binary registers.

The computer 100 currently is in a WAIT state waiting for its request to be served by the memory. In a manner to be subsequently discussed, the requested memory section 20 received its identity code over the MR leads, received the address of the data word over the AD leads, received a signal indicating whether or not the interaction is a READ or WRITE over the RW lead, and it received the identity of the process making the request over the CRM leads.

When the computer's read request is honored by the memory and data is delivered by the requested memory section to the requesting computer module 10, the identity of the requesting computer Ci is placed on the CR leads of bus 16 by the memory and is sent to comparator 90 which is similar to comparator 50 and which generates a high on lead 92 when its identity code is detected. A high on lead 92 partially enables gate 98. Gate 98 is then activated by a high signal on lead LDRC from the requested memory section and a high input on READ/WRITE lead 120. A high on lead 120 indicates that a READ interaction is occurring while a low indicates that a WRITE interaction is occurring. Gate 98 then outputs a high signal on lead 99 which extends through the OR gate 154 to the gate-in lead 156 of register R3.

The binary state of lead 120 from register R2 also controls the multiplexor 160. A READ indication on lead 120 (i.e., a high level) causes the multiplexor 160 to receive the data from the DATA bus 14 and enter it into register 158. A WRITE indication (i.e., a low level) on lead 120 causes the multiplexor 160 to receive data from bus 102. Therefore, in my present example, the state of lead 120 is high, the multiplexor 160 receives the data from bus DATA and extends it over path 162 to register R3.

In summary, the requested memory section provides an indication on led LDRC that is ready to transmit data over the DATA bus 14, and it further applies the identity code of computer module Ci to path CR. The high signal on lead LDRC enables gate 98 and loads register R3 with the data on bus 14 via multiplexor 160.

The output 92 of comparator 90 also partially enables gate 87 which receives the high LDRC signal and sets flip-flop RFF 84. Flip-flop RFF set indicates that the requested memory information has been gated into register R3 so that computer 100 can leave the WAIT timing state and enter the T3 timing state. This permits the data to be gated from register R3, through gate 104, and into computer 100. This completes the READ interaction beteen computer module Ci and a memory section 20.

The last interaction performed by the interface logic of computer module Ci is the WRITE interaction. During the T1 and T2 timing states associated with the initial service request by the computer registers R1 and R2 were loaded with the memory section identity code and the address data of the memory word to be read or written as well as a bit indicating whether the interaction is a READ or WRITE. The computer then remains in its WAIT state until its request for a WRITE operation is honored.

Subsequently, when the addressed memory section 20 is ready to receive the data to be written into it, the memory section transmits the identity code of the requesting computer module Ci over the CR leads and into comparator 90 whereupon lead 92 becomes high. The memory section then applies a high signal to lead LDRC which combined with the high on lead 92 causes flip-flop RFF to be set.

With flip-flop RFF set, computer 100 leaves the WAIT timing state and enters timing state T3. The timing state T3 signal and the WRITE signal on lead 120 together activate gate 150 which generates a high signal on lead 152 to cause the data appearing on bus 162 to be gated into register R3. This information is received from bus 102 via multiplexor 160.

While computer 100 is still in state T3, flip-flop FFR, element 130, is set which over path 132 allows gate 134 to be subsequently enabled by an ML3 signal. The ML clock 28 shown in FIG. 1, now controls the transmittal of data from register R3 over path 106 and through gates 166 to the requested memory section. Upon the appearance of timing pulse ML3, (shown in FIG. 5) gate 134 generates a high condition on lead 136 to preset flip-flop FF5 140. With flip-flop FF5 preset, a high signal appears on lead 142. The concurrent appearance of the computer module's identity on leads CR the and LDRC signal on path 16 from the memory causes gate 94 to be enabled and flip-flop FF4 to be cleared by gate 97 in order to reinitialize FF4 for the next WRITE interaction. The high signal on lead 142 also partially enables gates 164 and 166. The information to be written is now gated from computer module $C_i$ into the requested memory section over leads DATA, since gates 166 and 164 were previously partially enabled by the high output on lead 96 of gate 94. A ready signal is also transmitted to the memory from gate 164 over lead RD. Computer 100 now leaves the T3 timing state and continues normal data processing.

Figure 3:
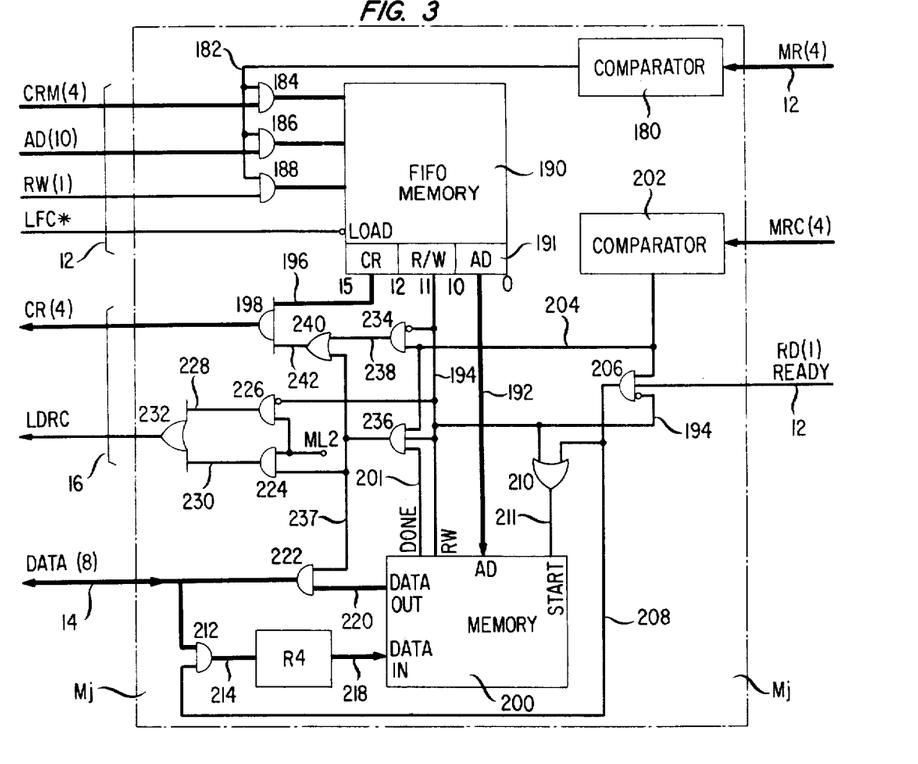
FIG. 3 discloses the logic interface comprising one plurality of memory sections found in FIG. 1.

A typical memory section $M_j$ is shown in FIG. 3 as comprising a memory 200 into which any computer module 10 may READ or WRITE data and a FIFO memory 190 which stores computer module requests. The interface logic shown can perform three different interactions. The first interaction occurs between the computer modules 10 and the memory section $M_j$ when one or more computer modules request access to the same memory section. These requests are stored in the FIFO memory 190 and are served on a first-in first-out basis. The second interaction occurs when data is being read from memory 200; the third interaction occurs when data is being written into memory 200. Each interaction will now be discussed in detail.

In FIG. 1, when a computer module 10 is allowed access to a memory section 20 by the timing control 30, the identity of the requested memory section is delivered over the MR leads of bus 12, the address of the location in the memory that is to be read or written into is delivered over the AD leads of bus 12, and an indication of whether data is to be read or written into the requested memory section is delivered over the RW lead of bus 12. In addition, the identity of the requesting computer is delivered over the CRM leads of bus 12.

On FIG. 3, when memory section $M_j$ receives its identity code on leads MR, comparator 180 applies a high output to lead 182 to apply the identity of the requesting computer on leads CRM through gates 184 to the inputs of the FIFO memory 190. In a similar manner, the address appearing on leads AD is applied through gates 186 to the FIFO memory 190, and the READ/WRITE information is delivered from lead RW through gate 188 to the FIFO memory 190. The subsequent appearance of a signal on lead LFC, as previously discussed, causes the FIFO to load the above information. The FIFO memory 190 comprises two conventional 32 word by 8-bit memory paralleled elements manufactured by Signetics Corporation as MODEL 2535I and disclosed in SIGNETICS INTEGRATED CIRCUITS (1972) page 7-135.

The nature of the data stored within FIFO 190 is shown as indicated wherein bits 0 through 9 occupy the address AD, bit 10 is not used, bit 11 is the READ/WRITE bit RW and bits 12 through 15 are the computer identity bits CR.

FIFO 190, in the present embodiment, requires enough storage space to store requesting information from each of the computer modules 10. Therefore, if there are 16 computer modules, then there would be 16 storage locations in FIFO 190. It is evident that if all 16 computer modules 10 concurrently require access to memory section $M_j$, then each of their requests would be stacked in the order of receipt by the FIFO 190. In such a case, as shown in FIG. 1, when the CL clock 22 advances the computer poller 26, the request from each computer section 10 would be sequentially loaded into the FIFO 190.

It is to be noted that the loading of FIFO 190 occurs independently of the remaining interactions in memory section $M_j$ and is wholly dependent upon the timing from the CL clock 22 in timing control 30.

The remaining interface logic for FIG. 3 is concerned only with the next computer request that is to be served. This is the computer request 191 occupying the bottom of the stack of FIFO 190. As shown in FIG. 3, the identity of the computer module CR making the memory request is applied over leads 196 through gates 198 and over the CR leads of bus 16 back to the requesting computer module when gates 198 are subsequently enabled by lead 242. The address AD of the information in the memory is directly delivered over leads 192 to the ADDRESS input of memory 200. The READ/WRITE bit RW is delivered to a variety of places which will be more thoroughly discussed in the following.

During a memory READ operation (i.e., when RW is high), OR-gate 210 extends the high on lead 194 over lead 211 to the START input of memory 200. Memory 200 comprises a conventional memory manufactured by INTEL Corp. as Model in-50, page 716 of the INTEL DATA CATALOGE (1975).

Upon completion of the memory READ operation under control of the address information appearing on leads 192, a DONE signal is applied over lead 201 to gate 236. The DONE signal in combination with a high from the READ/WRITE bit RW on lead 194 and the recognition by the memory section $M_j$ of the receipt of its identity code on path MRC by comparator 202 (i.e., a high on lead 204), causes gate 236 to place a high on lead 237.

Figure 5:
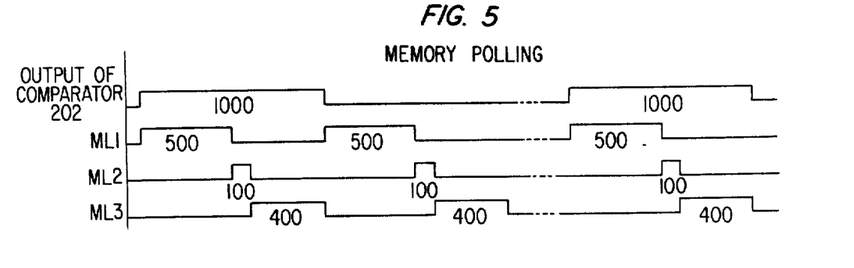
FIG. 5 discloses the timing sequence necessary for activating the interface logic control of FIG. 3.

Therefore, when the ML clock 28 of FIG. 1 generates a timing pulse over lead ML1 to increment the memory poller 32 to the identity code for memory section $M_j$, the high output of comparator 202 enables gate 236 to deliver a high output over lead 237 through OR-gate 240 and over lead 242 to apply the identity code CR of the computer module that made the READ request through gates 198 and over the CR leads of bus 16. In addition, the high output of gate 236 is further delivered over lead 237 to gate 222 to enable the delivery of the data read from the memory over leads 220 through gate 222 and over the DATA bus 14. And finally, the enabling of gate 236 also causes gate 224 to be partially enabled which, when later strobed by the ML2 timing pulse from the ML clock 28, delivers a high signal from gate 224 over lead 230, through OR-gate 232, and over the LDRC lead to the requesting computer. The timing sequence of the ML clock 28 pulses are illustrated in FIG. 5. The receipt of the CR, the LDRC, and DATA information on bus 16 by the requesting computer module for a READ interaction was previously analyzed in the above discussion for computer module Ci.

It is to be understood that memory poller 32 in FIG. 1 delivers the necessary timing signals via comparator 202 to allow memory section Mj a dedicated access over bus 16 to the requesting computer and that, during this time interval, no other memory section 20 has access to any computer over bus 16. The interface logic just described performs the reading function and then it waits for its turn on the time division bus 16 as specified by the appearance of its identity code in comparator 202.

As soon as the data read from memory 200 is delivered to the computer, the next item in FIFO memory 190, in a conventional manner, is delivered to memory position 191. If the next request is a WRITE interaction, then information must be gated from the requesting computer module and into the interface logic of memory section Mj before any further action by the interface logic can be done. Therefore, when the RW bit is low (i.e., indicating a WRITE interaction) a low appears on lead 194 and it is extended to the inversion inputs of gates 226 and 234. Upon the next receipt of the memory section Mj identity code by comparator 202, a high is generated on lead 204 which is delivered to gate 234 and which in combination with the low on lead 194 delivers a high over lead 238 through OR-gate 240 to enable gates 198 to transmit the identity code CR of the requesting computer module from leads 196 over the CR leads of bus 16. Upon the appearance of the ML2 timing pulse from ML clock 28, gate 226 is activated to transmit a high over lead 228 through OR-gate 232 and over the LDRC lead of bus 16.

As previously mentioned in the discussion of FIG. 2, when the interface logic of computer module Ci is processing a WRITE command, computer 100 is waiting for the return of a signal on lead LDRC. When a high is received on the LDRC lead of FIG. 2 and comparator 90 detects the identity code CR of the computer module, gate 87 becomes enabled to deliver a high over lead 89 to set the RFF flip-flop 84 and to bring the computer 100 out of the WAIT timing state. In addition, gate 94 is enabled by the high on lead 92, the high on lead LDRC and the low appearing on the READ/WRITE lead 120. Gate 94 enabled causes gates 164 and 166 to deliver the ready signal on lead RD and the data to be written into the memory section Mj over leads DATA.

Referring now to FIG. 3, receipt of a high on ready lead RD enables gate 206 to provide a high over lead 208 which is delivered through OR-gate 210 over lead 211 to the START input of memory 200. At the same time, the data to be written is delivered from the computer module through the enabled gate 212 and over path 214 into register R4. Register R4 directly delivers the data over path 218 into the DATA IN input of memory 200. Therefore, the data appearing in register R4 is written into the memory location specified by the address AD on leads 192 upon the activation of the START command appearing on lead 211.

What is claimed is:
1. A multiprocessing system comprising:
   a plurality of computers,
   a plurality of memory sections,
   a time multiplexed bus system interconnecting said computers with said memory sections,
   computer polling means for repetitively and sequentially polling said computers to determine whether any one of said polled computers currently, requires access to any one of said memory sections,
   computer gating means responsive to a determination that a polled computer currently requires said access for connecting said polled computer over said bus system to said one memory section for a time interval controlled by said computer polling means,
   means in said polled computer for transmitting service request information to said one memory section over said bus system during said time interval,
   memory polling means for repetitively and sequentially polling said memory sections to determine whether any one of said polled memory sections currently requires access to any one of said computers, said memory polling means being asynchronously operated with respect to said computer polling means,
   memory gating means responsive to a determination that a polled memory section currently requires access to one of said computers for connecting said polled memory section over said bus system to said one computer for a time interval controlled by said memory polling means, and
   means for transmitting information over said bus system between said polled memory section and said one computer during said last named time interval.

2. The system of claim 1 wherein said computer polling means comprises:
   means for generating computer timing pulses,
   means responsive to the generation of said computer timing pulses for repetitively interrogating said computers sequentially one at a time, and
   means for enabling said computer gating means when an interrogated computer requires access to a memory section.

3. The system of claim 2 wherein said means for interrogating said computers comprises:
   means responsive to said computer timing pulses for repetitively generating a sequence of different identity codes with each code being unique to a different one of said computers,
   means for applying each generated code to all of said computers, and
   means in each of said computers responsive to the receipt of its identity code for activating its gating means.

4. The system of claim 3 wherein said memory polling means comprises:
   means for generating memory timing pulses,
   means responsive to the generation of said memory timing pulses for repetitively interrogating said memory sections sequentially one at a time, and
   means for enabling said memory gating means when an interrogated memory section requires access to one of said computers.

5. The system of claim 4 wherein said means for interrogating said memory sections comprises:
   means responsive to said memory timing pulses for repetitively generating a sequence of different identity codes with each code being unique to a different one of said memory sections,
   means for applying each generated memory identity code to all of said memory sections, and means in each of said memory sections responsive to the receipt of its identity code for activating its gating means.

6. A multiprocessing system comprising:
a plurality of computers,
a plurality of memory sections,
a plurality of time multiplexed buses interconnecting said computers with said memory sections,
computer polling means for repetitively and sequentially polling said computers to determine whether any one of said polled computers currently requires access to any one of said memory sections,
computer gating means responsive to a determination that one of said polled computers currently requires access to one of said memory sections for gating service request information from said one computer onto a first set of said buses for transmission to said one memory section, said service request innformation including the identity codes of said one computer and said one memory section,
means in said one memory section for storing said transmitted information except for said one memory section identity code,
memory polling means for repetitively and sequentially polling said memory sections to determine whether any one of said polled memory sections currently requires access to any one of said computers, said memory polling means being asynchronously operated with respect to said computer polling means,
memory gating means responsive to a determination that one of said memory sections currently requires access to one of said computers for gating information including said one computer identity code from said one memory section onto a second set of said buses for transmission to said one computer, and
means effective upon the transmission of said identity code to said one computer for transmitting information over said second set of said buses between said one computer and said one memory section.

7. The system of claim 6 wherein said computer polling means comprises:
a means for generating computer timing pulses,
means responsive to the generation of said computer timing pulses for repetitively interrogating said computers sequentialy one at a time, and
means for enabling said computer gating means when an interrogated computer requires access to one of said memory sections.

8. The system of claim 7 wherein said memory polling means comprises:
a means for generating memory timing pulses,
means responsive to the generation of said memory timing pulses for repetitively interrogating said memory sections sequentially one at a time, and
means for enabling said memory gating means when an interrogated memory requires access to one of said computers.

9. The system of claim 8 wherein said means for nterrogating said computers comprises:
means responsive to said computer timing pulses for repetitively generating a sequence of different identity codes each of which is unique to a different one of said computers,
means for applying each generated code to all of said computers, and means in each of said computers responsive to the receipt of its identity code for activating its gating means.

10. The system of claim 9 wherein said means for interrogating said memory sections comprises:
means responsive to said memory timing pulses means for repetitively generating a sequence of different identity codes each of which is unique to a different one of said memory sections,
means for applying each generated memory section identity code to all of said memory sections, and
means in each of said memory sections responsive to the receipt of its identity code for activating its gating means.

11. A multiprocessing system comprising:
a plurality of computers,
a plurality of memory sections,
a time multiplexed bus system comprising a plurality of buses interconnecting each of said computers with each of said memory sections,
means for repetitively and sequentially polling said computers to determine whether any one of said polled computers currently requires access to one of said memory sections,
means including gating means in each computer responsive to a determination that one of said polled computers currently requires access to one of said memory sections for connecting said one polled computer over a first set of said buses to said one memory section,
means effective upon said connection for transmitting the identity code of said one memory section and service request information from said polled computer to said one memory section for storage therein, said service request information including the identity code of said one polled computer as well as a read or write request signal and memory address information,
means for repetitively and sequentially polling said memory sections to determine whether any one of said polled memory sections currently requires access to one of said computers, said memory polling means and said computer polling means being asynchronously operated with respect to each other,
means in each memory section including a memory gating means responsive to the polling of a memory section that currently requires access to one of said computers for connecting said polled memory section over a second set of said buses to said one computer,
means responsive to said last named connection for transmitting the identity code of said one computer from said polled memory section to said one computer over said second set of buses, and
means effective upon said last named connection of said polled named memory section for transmitting information over said second set of buses between said polled memory section and said one computer.

12. The system of claim 11 wherein said computer polling means comprises:
means for generating computer timing pulses,
means responsive to the generation of said timing pulses for generating coded computer interrogation pulses,
means for applying said interrogation pulses to said computers to repetitively interrogate said computers sequentially one at a time, and means for enabling said computer gating means for the duration of an interrogation pulse when an interrogated computer requires access to a memory section.

13. The system of claim 12 wherein said means for generating coded computer interrogation pulses comprises:

means responsive to said computer timing pulses for repetitively generating a sequence of different identity codes with each code being unique to a different one of said computers, means for applying each generated code to all of said computers, means in each of said computers responsive to the receipt of its identity code for activating its gating means for the duration of the receipt of its coded interrogation pulse, means responsive to the interrogation of a computer that requires access to one of said memory sections for transmitting a service request signal to said computer polling means, and means responsive to said service request signal for increasing the time duration of the interrogation pulses applied to said interrogated computer.

14. The system of claim 13 wherein said memory polling means comprises:

means for generating memory timing pulses, means responsive to the generation of said memory timing pulses for generating coded memory interrogation pulses, means for applying said memory interrogation pulses to said memory sections for repetitively interrogating said memory sections sequentially one at a time, and means for enabling said memory gating means for the duration of an interrogation pulse.

15. The system of claim 14 wherein said means for generating memory interrogation pulses comprises:

means responsive to said memory timing pulses for repetitively generating a sequence of different identity codes with each code being unique to a different one of said memory sections, means for applying each generated memory identity code to all of said memory sections, means in each of said memory sections responsive to the receipt of its identity code for activating its gating means for the duration of the receipt of its coded interrogation pulses, and means responsive to the interrogation of a memory section for transmitting information over said bus system to one of said computers.

16. In a multiprocessor system having a plurality of computers, a memory having interleaved sections, a plurality of time multiplexed buses interconnecting said computers with said memory sections, each of said buses being common to all of said computers and all of said memory sections, a first clock for generating computer timing pulses, means controlled by said computer timing pulses for repetitively and sequentially polling each of said computers one at a time to determine whether any one of said polled computers currently requires access to any one of said memory sections, computer gating means responsive to a determination that one of said computers requires access to one of said memory sections for gating service request information including the identity code of said one memory section to a first set of said buses, said service request information further including the identity code of said one polled computer as well as a read or write request signal and memory address information, means in said one memory section responsive to the appearance of its identity code on said first set of buses for registering the remainder of said service request information transmitted from said one polled computer, a second clock asynchronously operated from said first clock for generating memory timing pulses, means controlled by said memory timing pulses for repetitively and sequentially polling each of said memory sections one at a time, means responsive to the polling of a memory section having registered service request information from one of said computers for applying information including the identity code of said one computer to a second set of said buses, and means responsive to the appearance of said one computer identity code on said second set of buses for transmitting information between said one computer and sais polled memory section.

17. The system of claim 16 in which said means for polling said computers further comprises:

means responsive to the polling of a computer that requires access to one of said memory sections for applying a set of long duration control pulses to said polled computer, means responsive to said long duration control pulses for controlling the transmission of said service request information from said polled computer to said one memory section, and means responsive to the polling of a computer that does not require access to one of said memory sections for applying a set of short duration control pulses to said polled computer.

18. The system of claim 17 in which said computer polling means sequentially polls each of said computers in a first recurring time interval, and in which said memory polling means sequentially polls each of said sections in a second recurring time interval that a asynchronous from said first time interval.

19. In a multiprocessor system having a plurality of computers, a plurality of memory sections, a plurality of time multiplexed buses interconnecting each of said computers with each of said memory sections, means in each computer for generating a service request for access over a first set of said buses to one of said memory sections, means in each computer for registering the service request generated within the computer, computer polling means for repetitively and sequentially polling each of said computers for registered service requests one at a time, means including computer gating means responsive to the polling of a computer having a currently registered service request for applying service request information including the identity code of said one memory section and said polled computer to said first set of said buses, means in said one memory section responsive to the appearance of its identity code on said first set of buses for registering the remainder of the service request information applied to said first set of buses by said polled computer having a registered service request, memory polling means asynchronously operated with respect to said computer polling means for repetitively and sequentially polling each of said memory sections one at a time, means including memory gating means responsive to the polling of a memory section having registered service request information priorly received from one of said computers for applying information from said polled memory section to a second set of said buses with said information from said polled memory section including the identity code of said one computer that has priorly service request transmitted information to said polled memory section, and means responsive to the appearance of said one computer identity code on said second set of buses for transmitting information over said second set of said buses between said polled memory section and said one computer.

20. The system of claim 19 wherein said computer control means for polling said computers comprises:
means for generating computer timing pulses,
means responsive to the generation of said computer timing pulses for repetitively generating a sequence of different identity codes with each code being unique to a different one of said computers,
means for applying each generated code to all of said computers, and
means in each of said computers having a registered service request and responsive to the receipt of its identity code for activating its gating means to connect said computer signalwise to said first set of buses for the duration of the polling of said computer.

21. The system of claim 20 wherein said memory control means for polling said memory sections comprises:
means for generating memory timing pulses,
means responsive to the generation of said memory timing pulses for repetitively generating a sequence of different identity codes with each code being unique to a different one of said memory sections,
means for applying each generated memory identity code to all of said memory sections, and
means in each of said memory sections responsive to the receipt of its identity code for activating its gating means to connect said memory section signalwise to said second bus for the duration of the receipt of the polling of said memory section.

22. The system of claim 21 in which said computer control means for polling said computers further comprises:
means responsive to the polling of a computer that has a registered service request for applying a set of long duration control pulses to said polled computer,
means responsive to said long duration control pulses for controlling the transmission of said information from said polled computer to said one memory section, and
means responsive to the polling of a computer that does not have a registered service request for applying a set of short duration control pulses to said polled computer.

23. A method of operating a multiprocessor system in which a plurality of computers exchange information with a plurality of memory sections over a time multiplexed bus system having a plurality of buses, said method comprising the steps of:
1. registering a service request in each computer that requires access to a first set of said buses for the transmission of information to one of said memory sections,
2. repetitively and sequentially polling each of said computers for service requests one at a time,
3. applying service request information including a memory section identity code from a polled computer to said first set of buses whenever the polled computer contains a registered service request, said service request information further including the identity code of said polled computer as well as a read request signal and memory section address information specifying the memory location to be read,
4. registering in said one memory section said service request information on said first set of buses except for the memory section identity code,
5. repetitively and sequentially polling the memory section asycnchronously with respect to said computers,
6. applying the identity code of one of said computers to a second set of said buses upon the polling of a memory section having registered service request information priorly received from said one computer,
7. reading out information stored in said specified location of said polled memory section,
8. applying said read out information to said second set of buses, and
9. registering in said one computer the information read out of said specified memory location and applied to said second set of buses from said polled memory section.

24. The method of claim 23 in which the step of polling said computers further comprises the steps of:
b 1. repetitively generating a sequence of different computer identity codes which each code being unique of said computers,
2. applying each generated computer identity code to all of said computers,
3. applying a set of computer control pulses of a first duration to each of said computers following the application of each computer identity code,
4. returning a service request signal to a computer controller upon the polling of a computer having a registered service request as the identity code of the polled control is applied, to the computer, and
5. increasing the duration of the control pulses applied to a polled computer upon the receipt of a service request signal from the polled computer.

25. The method of claim 23 in which said method further comprises the step of:
1 activating gating circuitry within a polled computer having a service request for controlling the application of said information from said polled computer to the said first bus during the polling duration.

26. The method of claim 23 in which the step of polling the memory sections comprises the steps of:
1. generating control pulses including memory section identity codes with each code being unique to a different said memory section,
2. applying each generated memory section code to all of said memory sections, and 3. activating gating circuitry in each polled memory section upon the receipt of its identity code for controlling the application of information from the polled memory section to the second bus.

27. A method of operating a multiprocessor system in which a plurality of computers exchange signal information with a plurality of memory sections over a time multiplexed bus system having a plurality of buses, said method comprising the steps of:
1. registering a service request in each computer that requires access to a first set of said buses for the transmission of information to one of said memory sections.
2. repetitively and sequentially polling each of said computers for service requests one at a time,
3. applying service request information including a memory section identity code from a polled computer to said first set of buses whenever the polled computer contains a registered service request, said service request information further including the identity code of said polled computer as well as a memory write request signal and memory section address information specifying the memory location into which information from said computer is to be written,
4. registering in said one memory section said service request information on said first set of buses except for the memory section identity code,
5. repetitively and sequentially polling the memory sections asynchronously with respect to said computers,
6. transmitting a computer identity code over a second set of said buses from a polled memory section having registered computer service request information over a second set of said buses to a computer that priorly transmitted service request information to said polled memory section, and
7. transmitting over said second set of buses from said computer to said polled memory section the information that is to be written in said specified location of said memory section.

* * * * *